United States Patent
Miyakawa

(10) Patent No.: US 10,073,331 B2
(45) Date of Patent: Sep. 11, 2018

(54) ILLUMINATION DEVICE AND LIGHT SOURCE CONTROL METHOD, AND PROJECTION DISPLAY APPARATUS

(71) Applicant: SONY CORPORATION, Tokyo (JP)

(72) Inventor: Kenta Miyakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/510,783

(22) PCT Filed: Sep. 11, 2015

(86) PCT No.: PCT/JP2015/075823
§ 371 (c)(1),
(2) Date: Mar. 13, 2017

(87) PCT Pub. No.: WO2016/047464
PCT Pub. Date: Mar. 31, 2016

(65) Prior Publication Data
US 2017/0277031 A1  Sep. 28, 2017

(30) Foreign Application Priority Data

Sep. 25, 2014 (JP) ................................. 2014-194770

(51) Int. Cl.
G03B 21/20 (2006.01)
G02B 26/08 (2006.01)
(Continued)

(52) U.S. Cl.
CPC ..... *G03B 21/2033* (2013.01); *G02B 26/0833* (2013.01); *G03B 21/2053* (2013.01); *G03B 33/12* (2013.01); *H04N 9/3102* (2013.01)

(58) Field of Classification Search
CPC .......... G03B 21/00; G03B 21/14; H04N 9/31; H04N 9/73; H05B 37/02; F21S 2/00; F21V 23/00
See application file for complete search history.

(56) References Cited

U.S. PATENT DOCUMENTS

2006/0238660 A1* 10/2006 Takeda ............... G03B 21/2033
                                                    348/801
2006/0279710 A1   12/2006 Tani
(Continued)

FOREIGN PATENT DOCUMENTS

| CN | 103376631 A | 10/2013 |
|---|---|---|
| CN | 104247574 A | 12/2014 |

(Continued)

OTHER PUBLICATIONS

International Search Report and Written Opinion of PCT Application No. PCT/JP2015/075823, dated Nov. 10, 2015, 09 pages of English Translation and 08 pages of ISRWO.

(Continued)

*Primary Examiner* — Sultan Chowdhury
*Assistant Examiner* — Danell L Owens
(74) *Attorney, Agent, or Firm* — Chip Law Group

(57) ABSTRACT

An illumination device of the disclosure includes a plurality of light sources and a correction unit. The plurality of light sources generate light having respectively different wavelengths. The correction unit corrects, on the basis of a change in relative luminosity, a light quantity of the light to be generated by at least one light source out of the plurality of light sources, to restrain a change in white balance. The change in the relative luminosity is caused by a change in wavelength associated with a change in temperature.

15 Claims, 15 Drawing Sheets

(51) Int. Cl.
  *G03B 33/12* (2006.01)
  *H04N 9/31* (2006.01)

(56) References Cited

U.S. PATENT DOCUMENTS

2013/0271732 A1  10/2013 Kuriaki et al.
2014/0253527 A1* 9/2014 Ogi .......................... G09G 5/02
                                                345/207

FOREIGN PATENT DOCUMENTS

| EP | 2653920 A2 | 10/2013 |
|----|------------|---------|
| JP | 2006-349731 A | 12/2006 |
| JP | 2007-156438 A | 6/2007 |
| JP | 2013-168529 A | 8/2013 |
| JP | 2013-222064 A | 10/2013 |
| JP | 2014-174239 A | 9/2014 |
| KR | 10-2013-0117663 A | 10/2013 |
| WO | 2014/136882 A1 | 9/2014 |

OTHER PUBLICATIONS

International Preliminary Report on Patentability of PCT Application No. PCT/JP2015/075823, dated Apr. 6, 2017, 10 pages of English Translation and 05 pages of IPRP.

* cited by examiner

[FIG. 1]
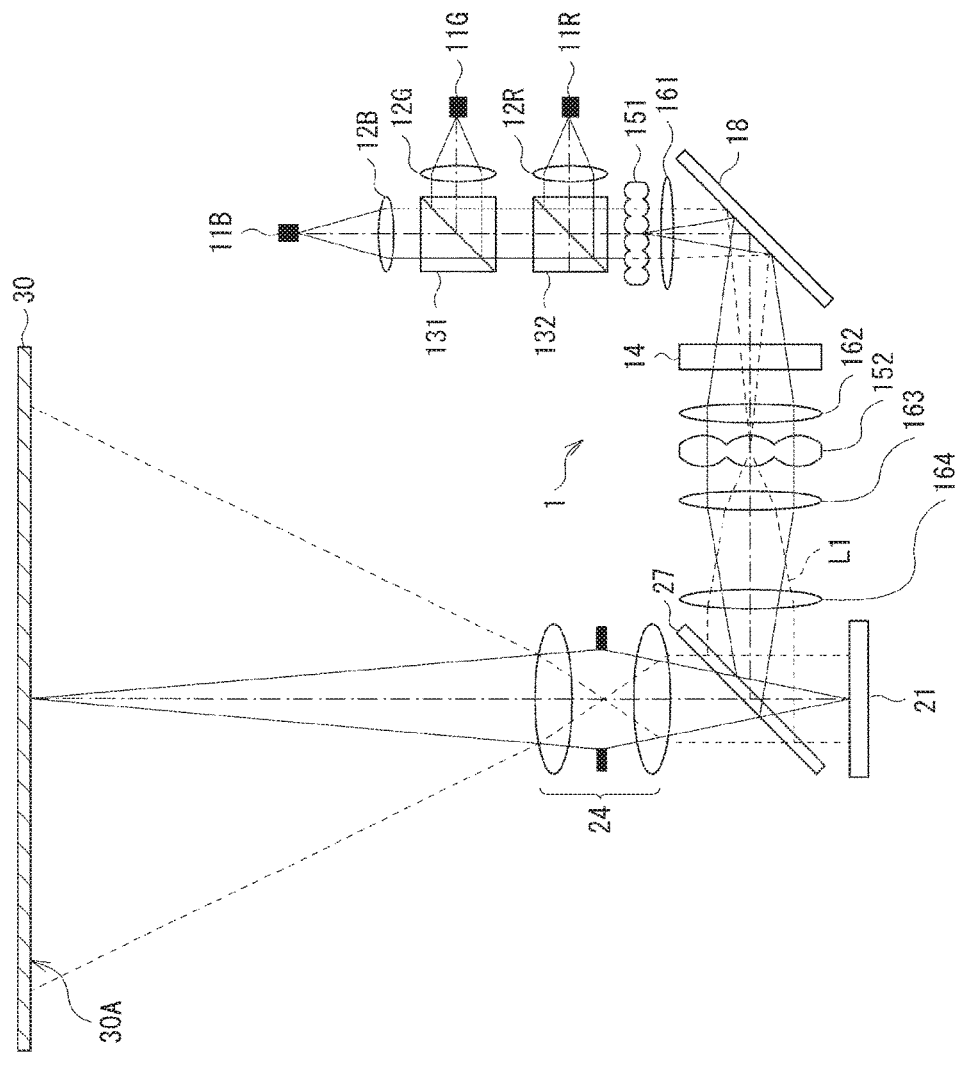

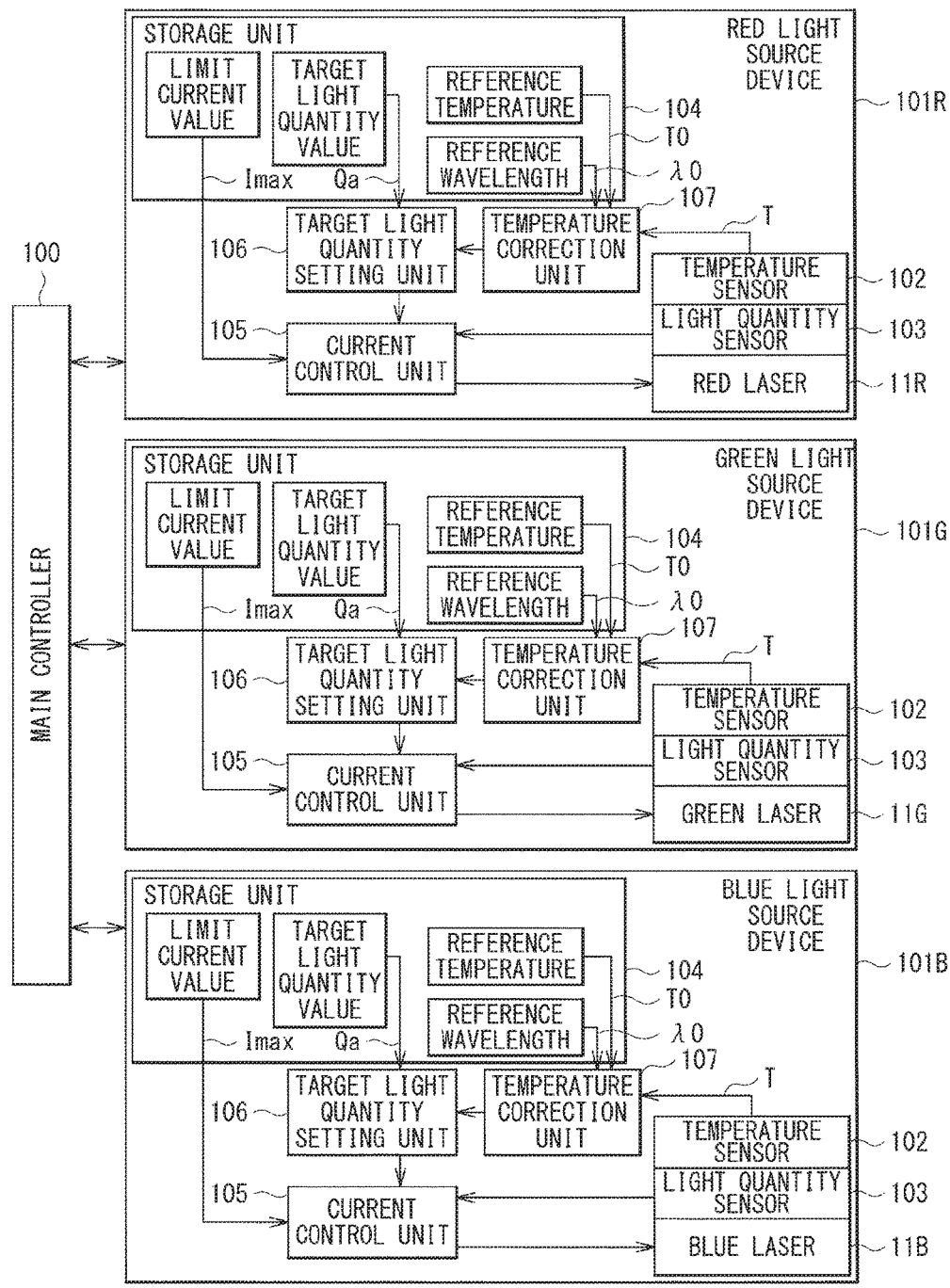
[FIG. 2]

[ FIG. 3 ]
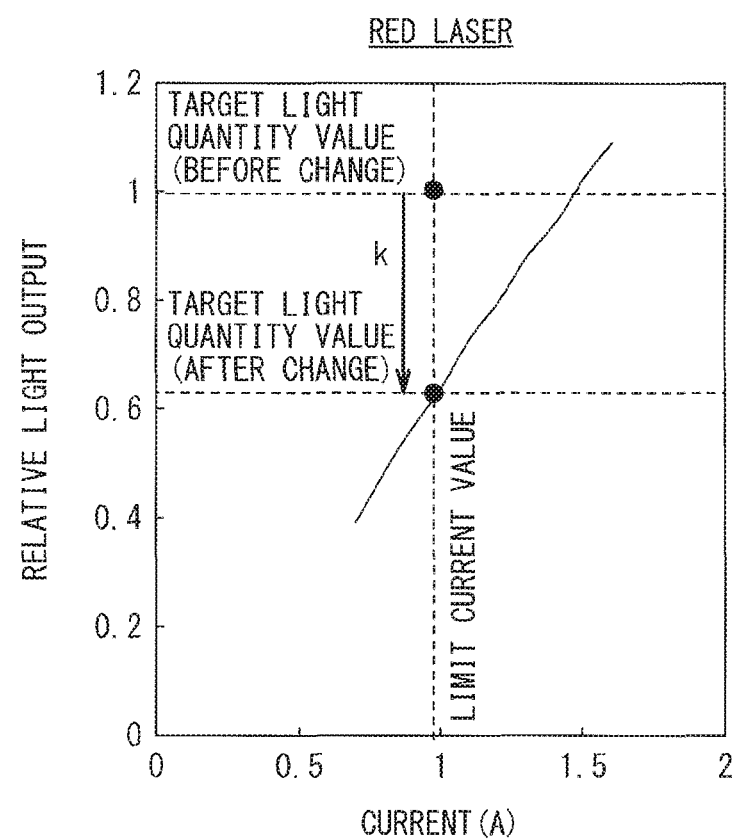

[ FIG. 4 ]
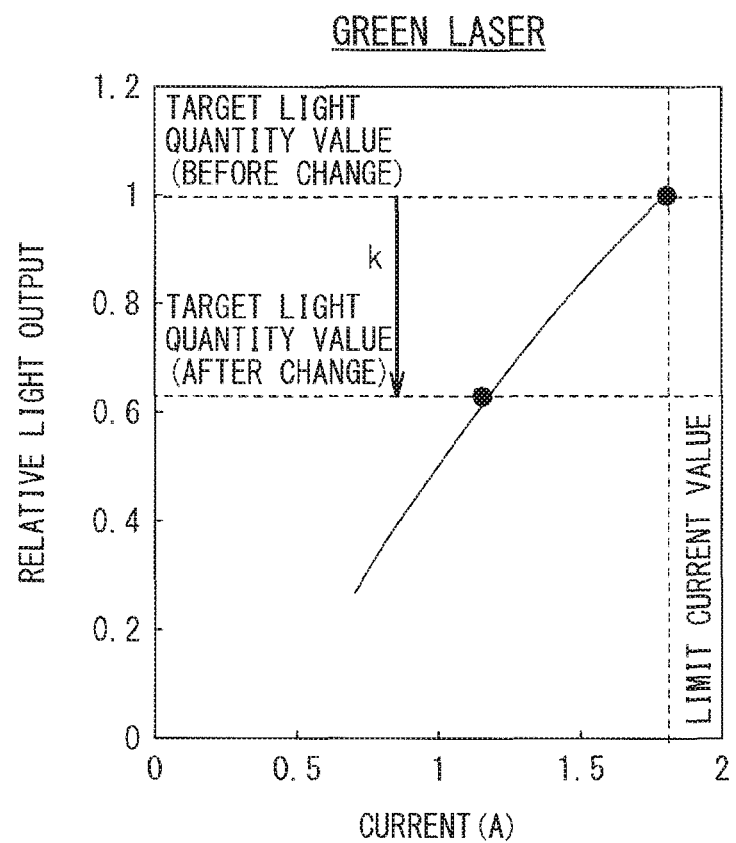

[ FIG. 5 ]
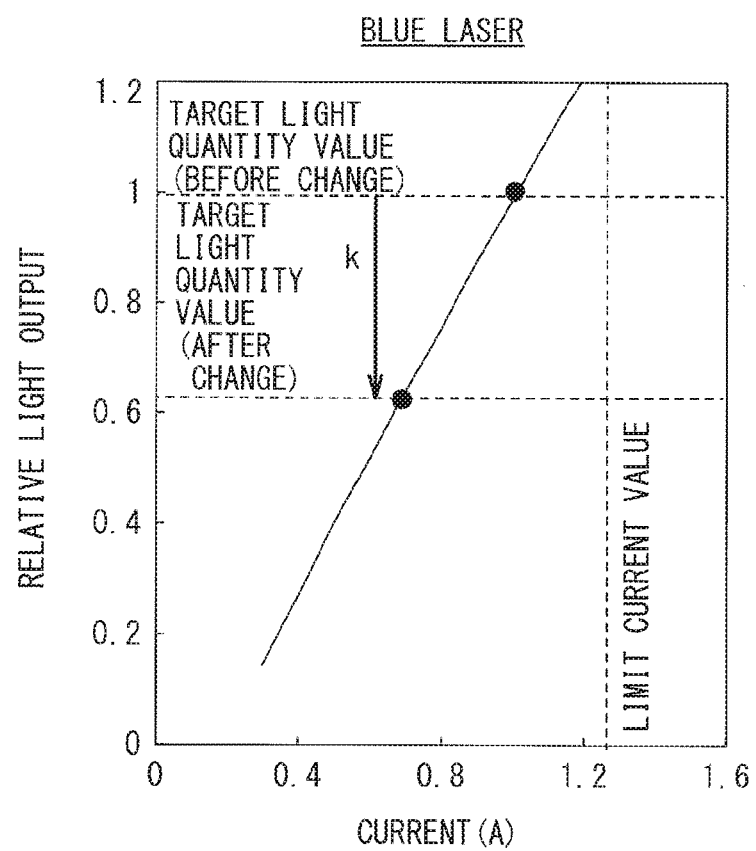

[ FIG. 6 ]
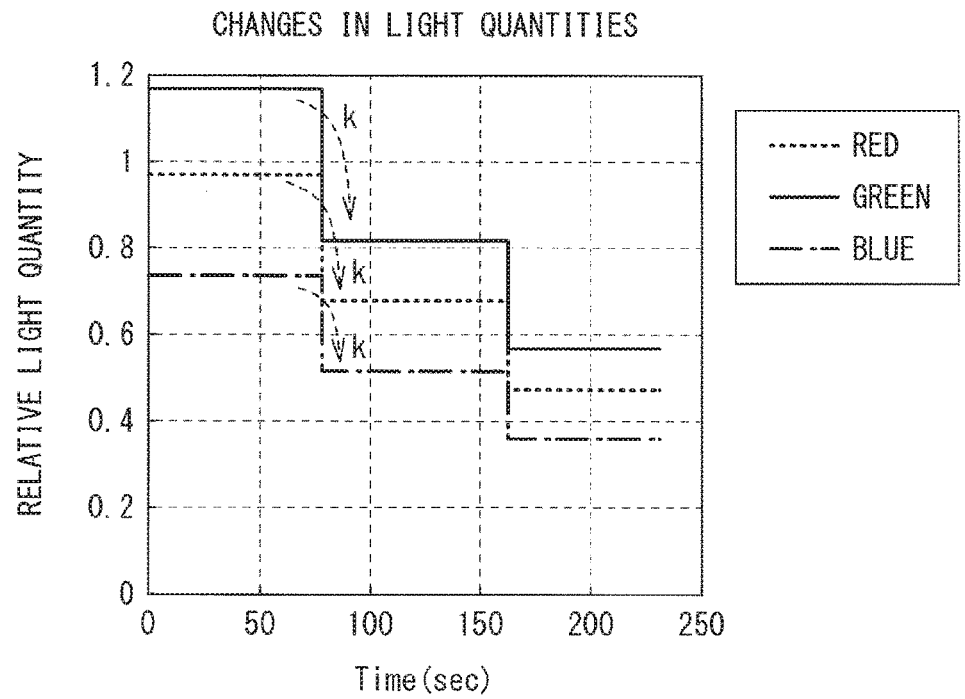
[ FIG. 7 ]
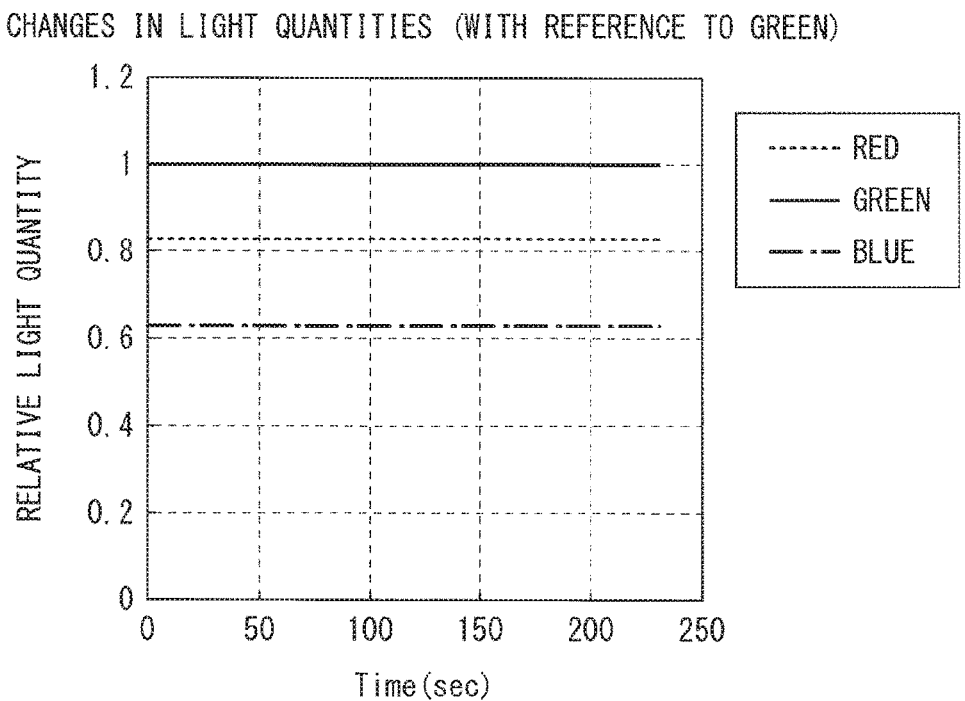

[ FIG. 8 ]
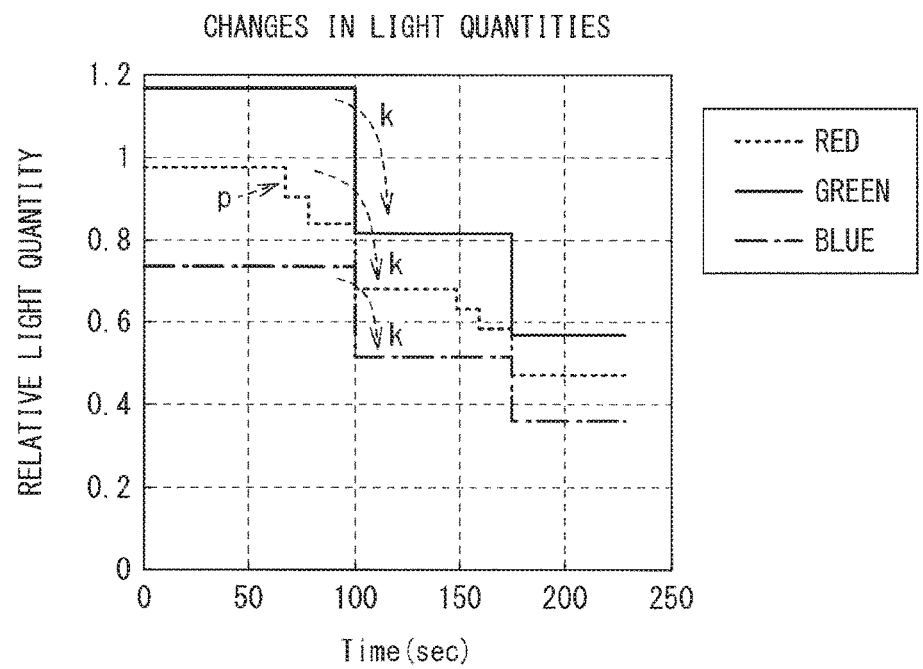
[ FIG. 9 ]
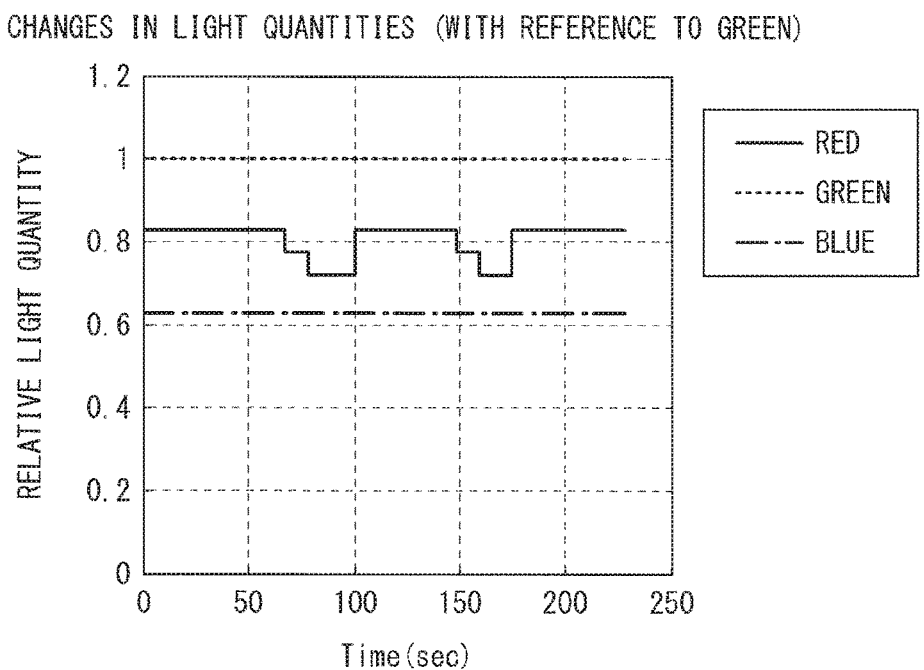

[ FIG. 10 ]
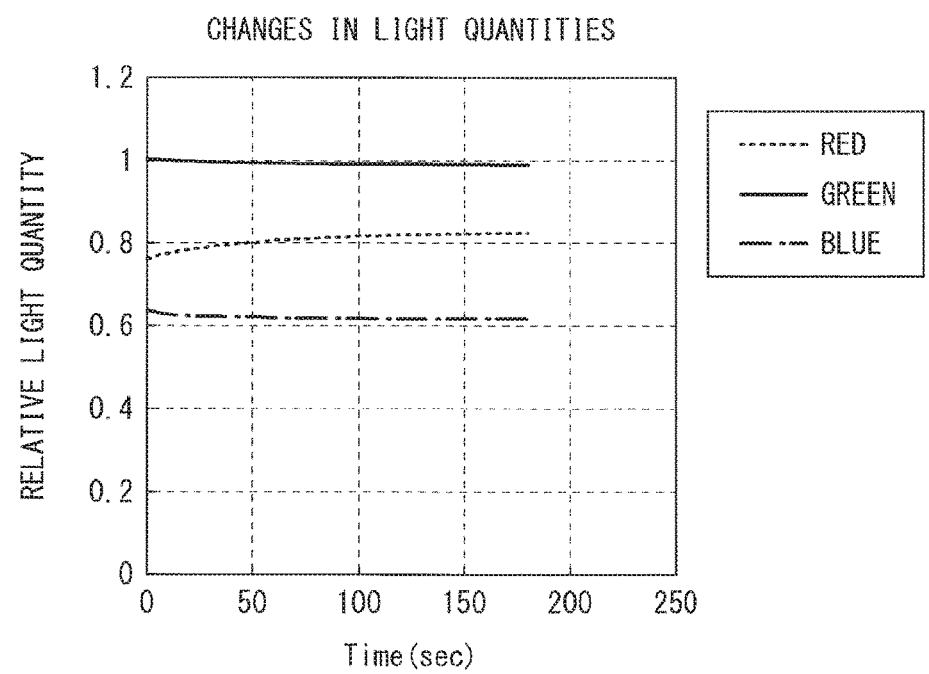
[ FIG. 11 ]
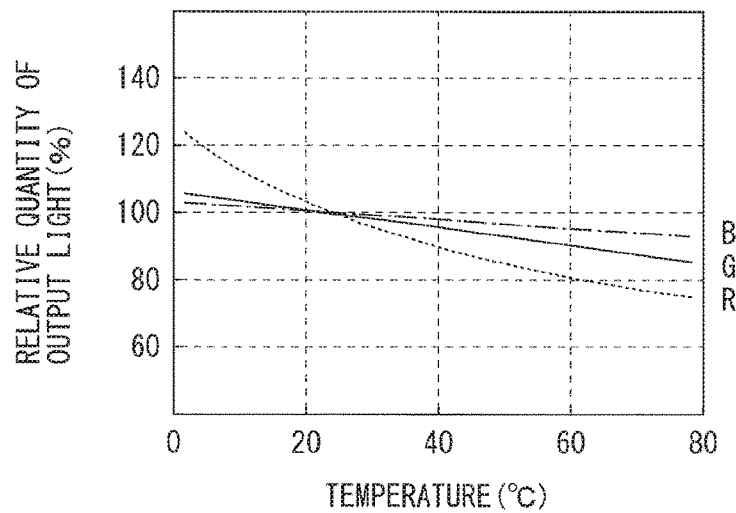

[ FIG. 12 ]
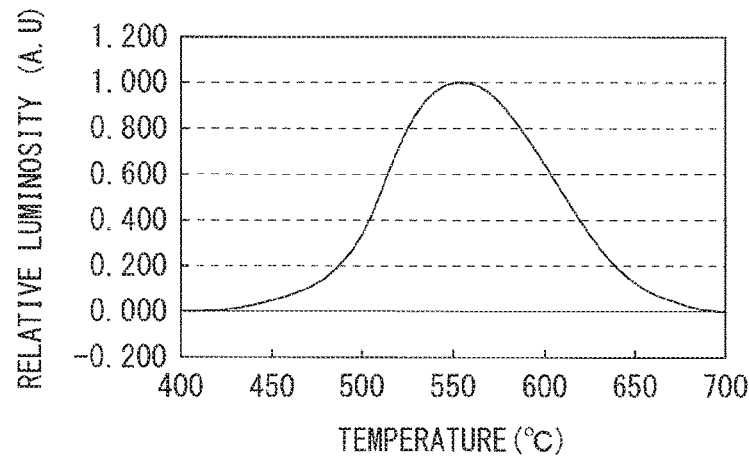
[ FIG. 13 ]
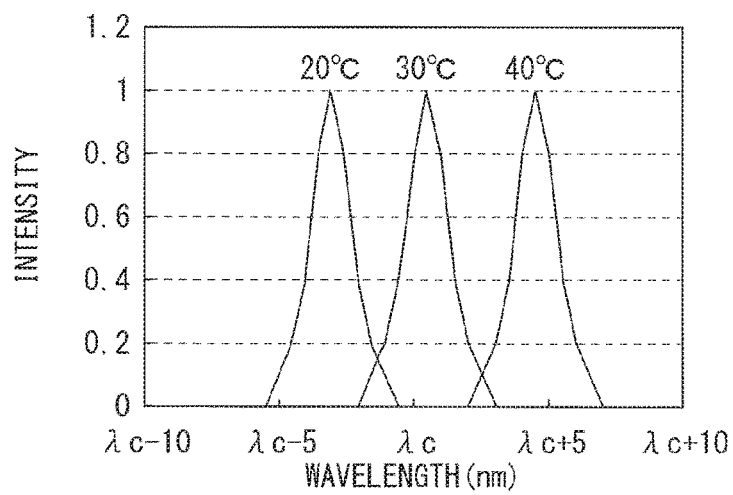
[ FIG. 14 ]
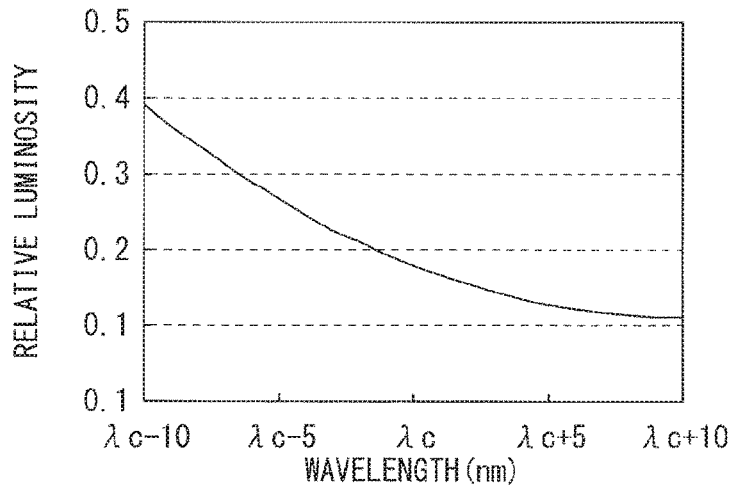

[ FIG. 15 ]
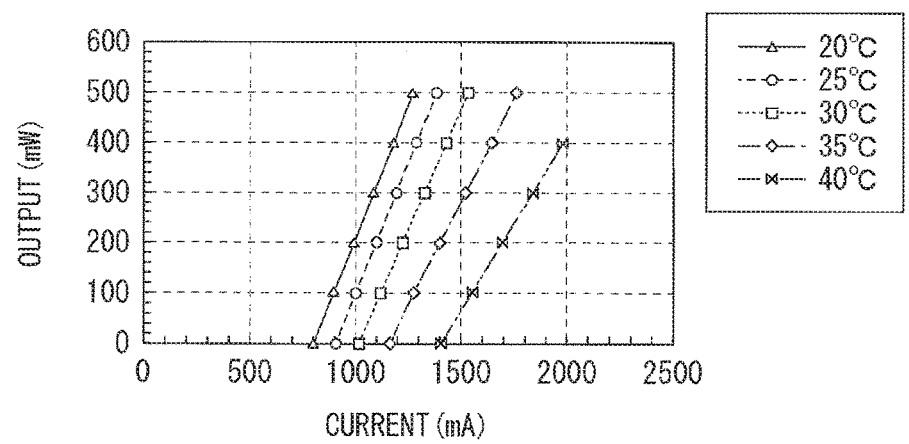
[ FIG. 16 ]
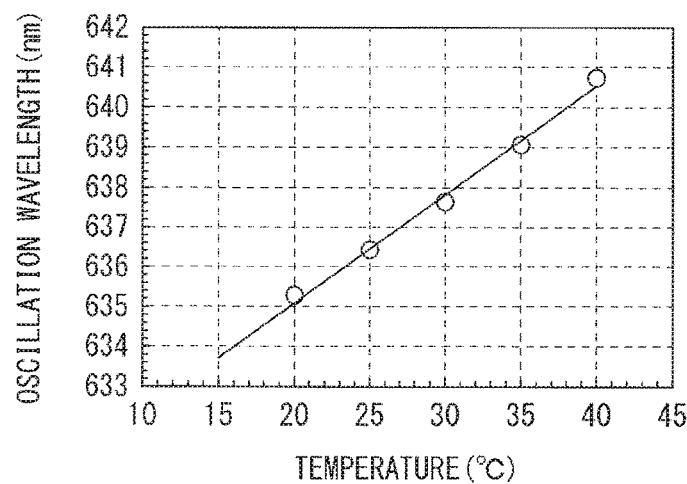

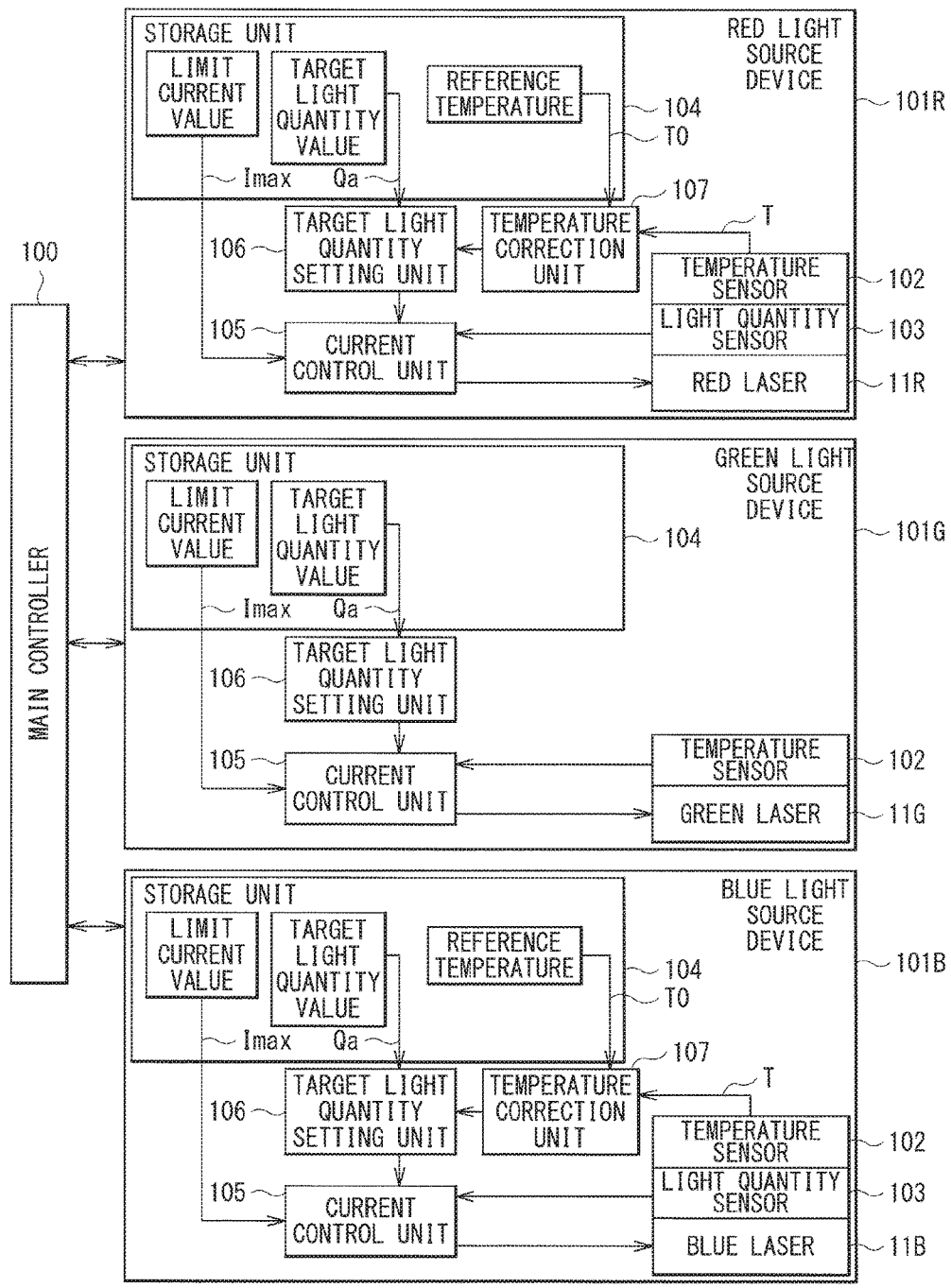
[ FIG. 17 ]

[ FIG. 18 ]
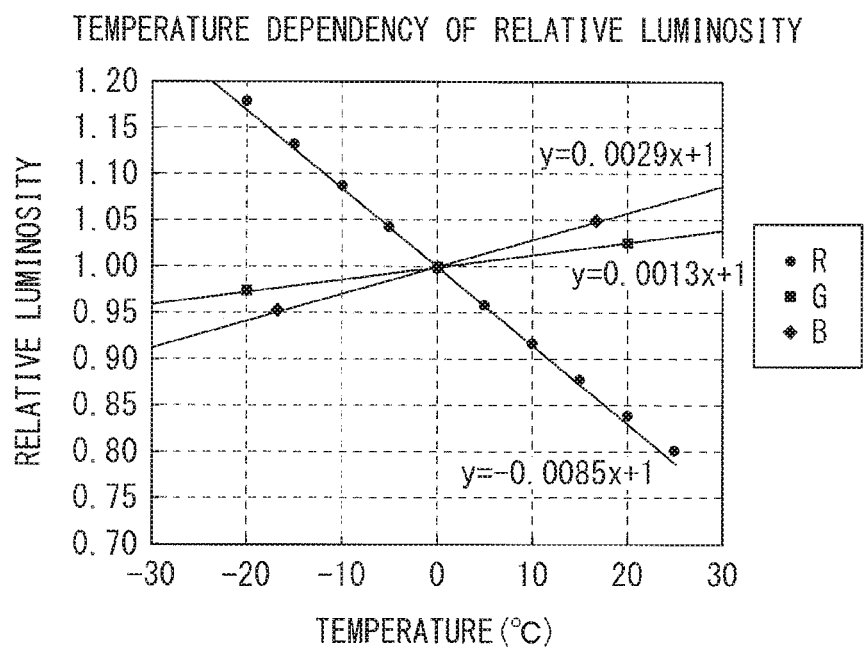
[ FIG. 19 ]
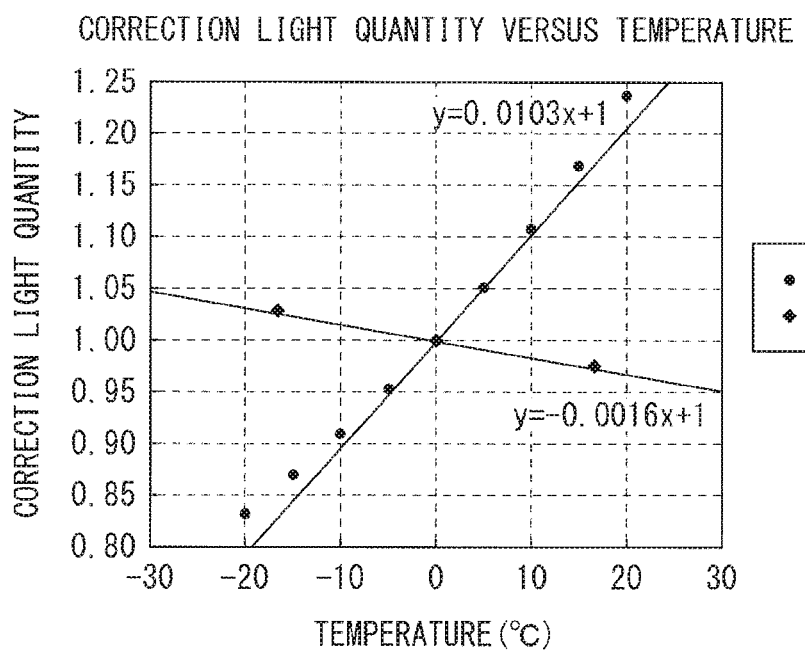

[ FIG. 20 ]
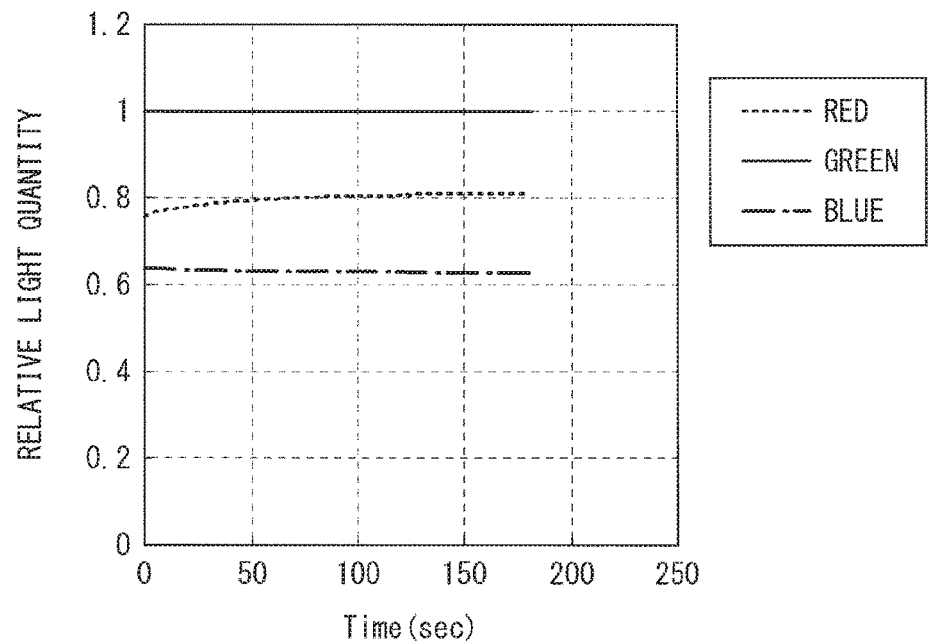
[ FIG. 21 ]
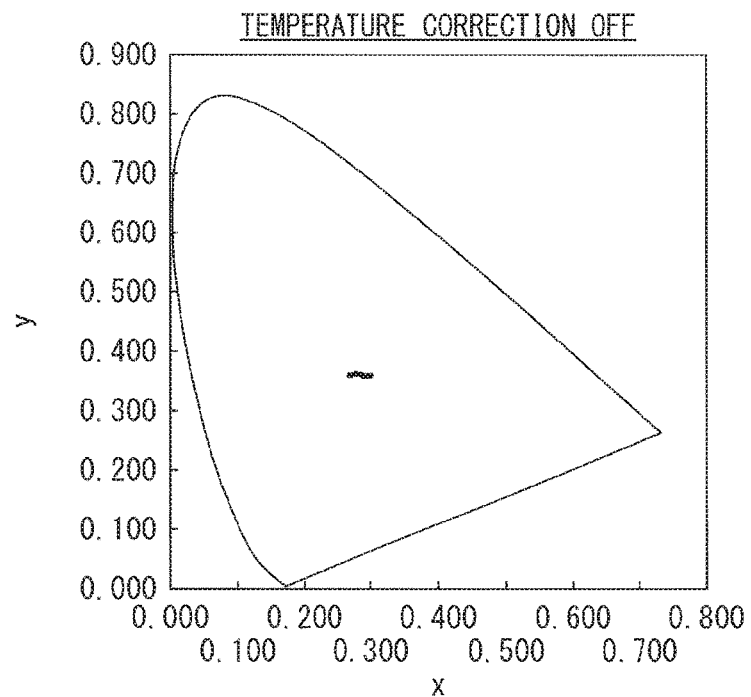

[ FIG. 22 ]
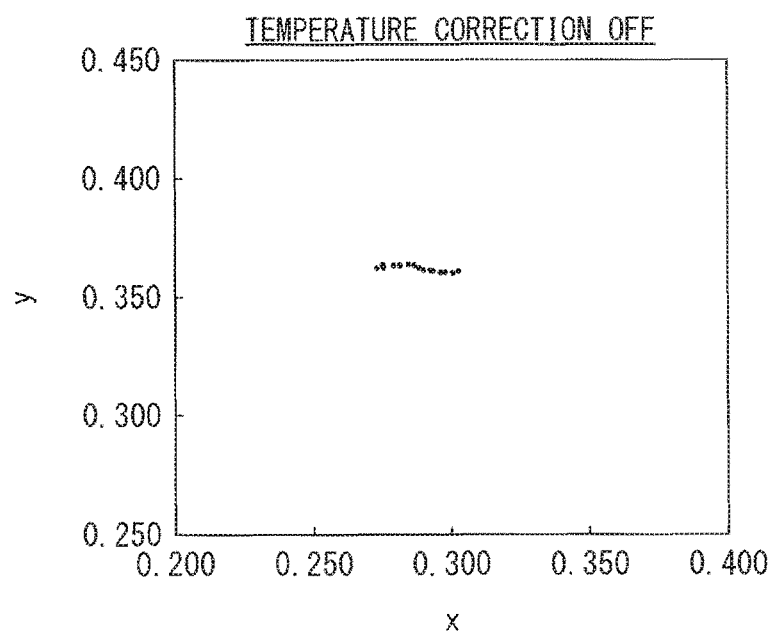
[ FIG. 23 ]
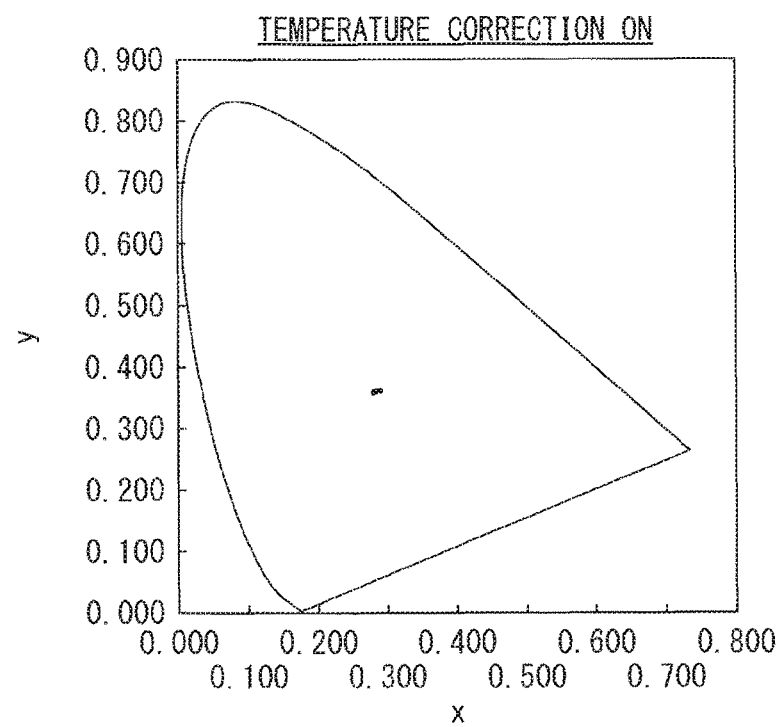

[ FIG. 24 ]
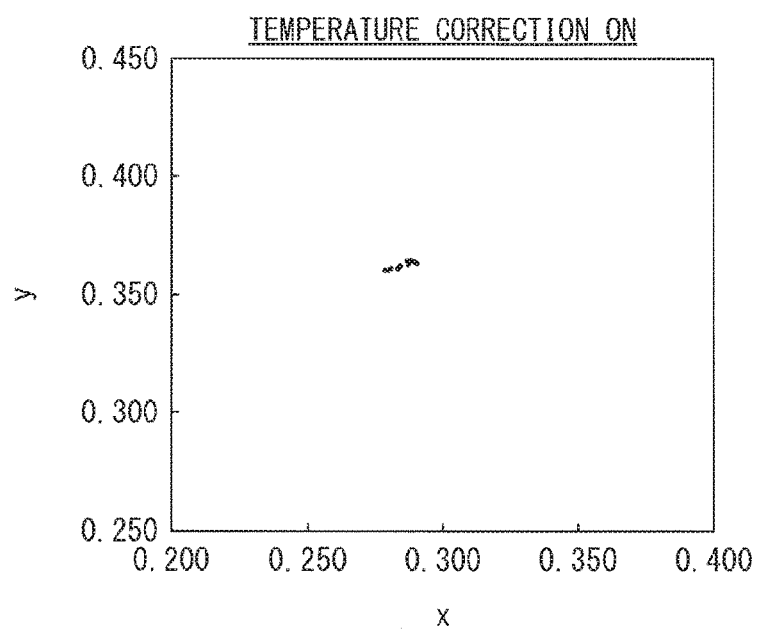
[ FIG. 25 ]
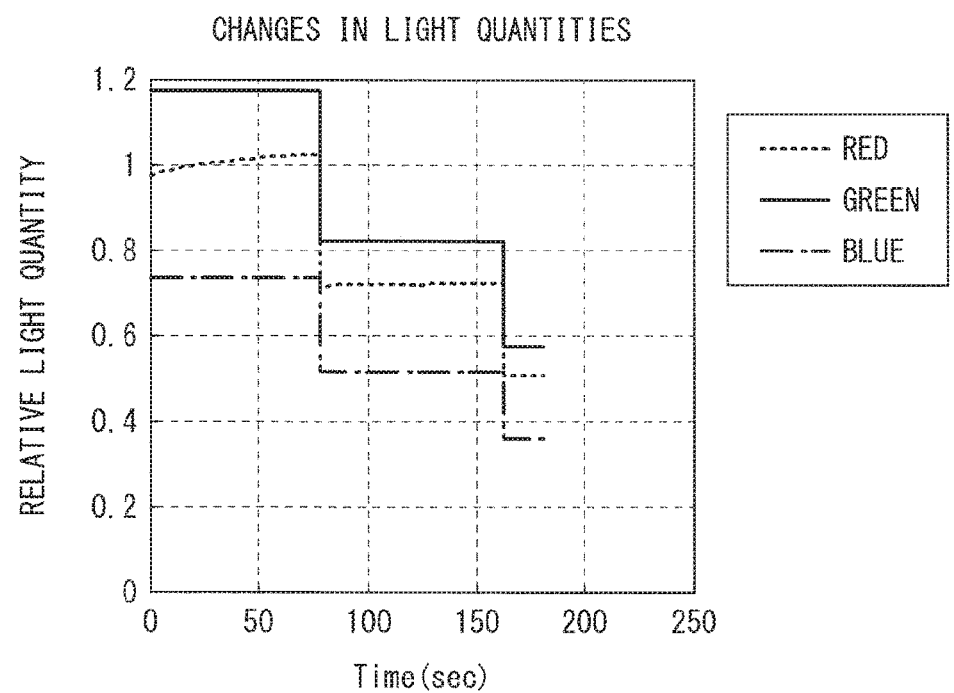

ILLUMINATION DEVICE AND LIGHT SOURCE CONTROL METHOD, AND PROJECTION DISPLAY APPARATUS

CROSS REFERENCE TO RELATED APPLICATIONS

This application is a U.S. National Phase of International Patent Application No. PCT/JP2015/075823 filed on Sep. 11, 2015, which claims priority benefit of Japanese Patent Application No. JP 2014-194770 filed in the Japan Patent Office on Sep. 25, 2014. Each of the above-referenced applications is hereby incorporated herein by reference in its entirety.

TECHNICAL FIELD

The disclosure relates to an illumination device and a light source control method, and a projection display apparatus that projects a picture with the use of light from the illumination device.

BACKGROUND ART

In recent years, projectors (projection display apparatuses) have been in wide use not only in offices but also in homes. The projector projects a picture on a screen. The projector allows a light valve (spatial modulation element) to modulate light from a light source, to generate image light, and to project the image light on the screen to perform display.

CITATION LIST

Patent Literature

PTL 1: Japanese Unexamined Patent Application Publication No. 2005-121688
PTL 2: Japanese Unexamined Patent Application Publication No. 2002-98937
PTL 3: Japanese Unexamined Patent Application Publication No. 2011-44545

SUMMARY OF THE INVENTION

As to an image projected by the projector, it is desired that white balance be constant. In a case with the use of light sources of different wavelengths (e.g., red, green, and blue), it is necessary to keep a ratio of their respective light output quantities constant.

Regarding this point, for example, as disclosed in PTL 1, there is a method of adjustment of the light quantities, in order to cope with an increase and a decrease in the light quantities of the light emitting elements of their respective colors. The increase and the decrease in the light quantities are associated with a change in temperature. The adjustment is made on the basis of data on changes in the light quantities of the respective light emitting elements with respect to the temperature (FIG. 4 of PTL 1), and the temperatures of the light emitting elements detected by temperature detectors. The data on the changes in the light quantities is stored in advance.

Now, let us spare a thought for a change in relative luminosity. As described in a paragraph 0023 and FIG. 3 of PTL 2, it is known that brightness sensed by human eyes (the relative luminosity) varies with wavelengths, even if the light quantity of the light is the same. Moreover, as stated in a paragraph 0006 and FIG. 30 of PTL 3, it is known that an increase in a temperature of a laser causes a light emission wavelength to be lengthened at a constant rate, which causes the change in the relative luminosity. In other words, in a case in which an element a wavelength of which has dependency on the temperature, e.g., the laser, is used as the light source, solely keeping the ratio of the light quantities constant results in a change in the white balance when the temperature changes significantly.

Another example involves, as in PTL 3, restraining the change in the temperature of the laser using a temperature control element (such as a Peltier element), to restrain the change in the white balance. This case, however, leads to involvement of the temperature control element. Moreover, a decrease in an output of the laser due to deterioration with time causes the change in the white balance.

It is therefore desirable to provide an illumination device and a light source control method, and a projection display device that make it possible to restrain a change in white balance.

An illumination device according to an embodiment of the disclosure includes a plurality of light sources and a correction unit. The plurality of light sources generate light having respectively different wavelengths. The correction unit corrects, on the basis of a change in relative luminosity, a light quantity of the light to be generated by at least one light source out of the plurality of light sources, to restrain a change in white balance. The change in the relative luminosity is caused by a change in wavelength associated with a change in temperature.

A light source control method according to an embodiment of the disclosure includes correcting, on the basis of a change in relative luminosity, a light quantity of light to be generated by at least one light source out of the plurality of light sources, to restrain a change in white balance. The change in the relative luminosity is caused by a change in wavelength associated with a change in temperature. The plurality of light sources generate the light having respectively different wavelengths.

A projection display apparatus according to an embodiment of the disclosure includes an illumination unit, a light valve, and a projection lens. The illumination unit generates illumination light. The light valve modulates the illumination light on the basis of picture data, and outputs resultant modulated light. The projection lens projects the modulated light from the light valve on a plane of projection. The illumination unit includes a plurality of light sources and a correction unit. The plurality of light sources generate light having respectively different wavelengths. The correction unit corrects, on the basis of a change in relative luminosity, a light quantity of the light to be generated by at least one light source out of the plurality of light sources, to restrain a change in white balance. The change in the relative luminosity is caused by a change in wavelength associated with a change in temperature.

In the illumination device or the light source control method, or the projection display device according to the embodiment of the disclosure, the light quantity of the light to be generated by the at least one light source out of the plurality of light sources is corrected, on the basis of the change in the relative luminosity caused by the change in the wavelength associated with the change in the temperature. This allows the change in the relative luminosity to be restrained.

According to the illumination device or the light source control method, or the projection display apparatus in the embodiment of the disclosure, the light quantity of the light to be generated by at least one light source out of the plurality of light sources is corrected, on the basis of the change in the relative luminosity caused by the change in the wavelength associated with the change in the temperature. Hence, it is possible to restrain the white balance.

It is to be noted that effects of the embodiments of the technology are not necessarily limited to the effects described above, and may include any of effects that are described in the disclosure.

BRIEF DESCRIPTION OF DRAWING

FIG. 1 is a configuration diagram that illustrates one example of an overall configuration of a projection display apparatus according to a first embodiment of the disclosure.

FIG. 2 is a block diagram that illustrates one configuration example of a control system of an illumination unit in the projection display apparatus according to the first embodiment.

FIG. 3 is a diagram that describes relation between a drive current and a light output of a red laser.

FIG. 4 is a diagram that describes relation between a drive current and a light output of a green laser.

FIG. 5 is a diagram that describes relation between a drive current and a light output of a blue laser.

FIG. 6 is a diagram that describes changes in light quantities according to a first example of current limiting operation in respective light source devices.

FIG. 7 is a diagram that describes the changes in the light quantities illustrated in FIG. 6, with reference to green.

FIG. 8 is a diagram that describes the changes in the light quantities according to a second example of the current limiting operation in the respective light source devices.

FIG. 9 is a diagram that describes the changes in the light quantities illustrated in FIG. 8, with reference to green.

FIG. 10 is a diagram that describes the changes in the light quantities in a case in which correction of target light quantity values by a temperature correction unit is enabled.

FIG. 11 is a diagram that describes relation between a temperature and output light quantities of laser light sources.

FIG. 12 is a diagram that describes relation between a wavelength and relative luminosity.

FIG. 13 is a diagram that describes one example of a change in wavelength in accordance with a temperature.

FIG. 14 is a diagram that describes relation between the wavelength and the relative luminosity.

FIG. 15 is a diagram descriptive of a change in the drive current in accordance with the temperature.

FIG. 16 is a diagram that describes one example of the change in the wavelength in accordance with the temperature.

FIG. 17 is a block diagram that illustrates one configuration example of a control system of an illumination unit in a projection display apparatus according to a second embodiment.

FIG. 18 is a diagram that describes dependency of the relative luminosity on the temperature.

FIG. 19 is a diagram that describes correction light quantities versus the temperature, with reference to green.

FIG. 20 is a diagram that describes the changes in the light quantities in the case in which the correction of the target light quantity values with the temperature correction units is enabled.

FIG. 21 is a diagram that describes a change in color balance with x-y chromaticity coordinates, in a case in which no correction of the target light quantity values with the temperature correction units is made (temperature correction OFF).

FIG. 22 is a partially enlarged diagram of FIG. 21.

FIG. 23 is a diagram that describes the change in the color balance with the x-y chromaticity coordinates, in a case in which the correction of the target light quantity values with the temperature correction units is enabled (the temperature correction ON).

FIG. 24 is a partially enlarged diagram of FIG. 23.

FIG. 25 is a diagram that describes an example of the changes in the light quantities, in a case in which changing operation of the target light quantity values on the basis of limit current values is combined with the correction of the target light quantity values with the temperature correction units.

MODES FOR CARRYING OUT THE INVENTION

In the following, some embodiments of the disclosure are described in detail with reference to the drawings. It is to be noted that description is made in the following order.
1. First Embodiment (FIGS. 1 to 16)
   1.1 Overall Configuration and Operation of Projection Display Apparatus
      1.1.1 Overall Configuration Example of Projection Display Apparatus
      1.1.2 Operation of Projection Display Apparatus
   1.2 Configuration and Operation of Control System of Illumination Unit
      1.2.1 Configuration Example of Control System of Illumination Unit
      1.2.2 Control Operation of Illumination Unit
   1.3 Effects
2. Second Embodiment (FIGS. 17 to 25)
   2.1 Configuration of Control System of Illumination Unit
   2.2 Control Operation of Illumination Unit
   2.3 Effects
3. Other Embodiments

1. First Embodiment

[1.1 Overall Configuration and Operation of Projection Display Apparatus]
[1.1.1 Overall Configuration Example of Projection Display Apparatus]

FIG. 1 illustrates one example of an overall configuration of a projection display apparatus (a projector) according to a first embodiment of the disclosure.

The projection display apparatus may include, as illustrated in FIG. 1, an illumination unit 1, a light valve 21, a wire grid 27, and a projection lens 24. The wire grid 27 may serve as a polarized light separation element.

The illumination unit 1 may emit illumination light L1 toward the wire grid 27. The illumination unit 1 may include a light source and a plurality of optical members for illumination. The plurality of optical members for illumination may generate the illumination light L1 on the basis of light from the light source, and guide the illumination light L1 to the light valve 21. The light source may include a plurality of light sources that are disposed respectively on different optical paths. The illumination unit 1 may also include an optical path composition element that composes two or more of the optical paths on which respective two or more light sources of the plurality of light sources are disposed.

In one more specific example, the illumination unit 1 may include a blue laser 11B, a green laser 11G, and a red laser 11R, as the plurality of light sources that are disposed respectively on the different optical paths. The illumination unit 1 may also include, as the plurality of optical members for illumination, a first coupling lens 12B, a second coupling lens 12G, and a third coupling lens 12R, a drive optical element 14, a mirror 18, a first dichroic prism 131, a second dichroic prism 132, a first fly eye lens 151, a second fly eye lens 152, a first condenser lens 161, a second condenser lens 162, a third condenser lens 163, and a fourth condenser lens 164.

The blue laser 11B may be a laser light source that generates blue light having a wavelength of, for example, about 450 nm. The green laser 11G may be a laser light source that generates green light having a wavelength of, for example, about 520 nm. The red laser 11R may be a laser light source that generates red light having a wavelength of, for example, about 640 nm.

The second coupling lens 12G may be a lens (a coupling lens) that collimates the green light emitted from the green laser 11G (into parallel light), and forms coupling to the first dichroic prism 131. Similarly, the first coupling lens 12B may be a lens (a coupling lens) that collimates the blue light emitted from the blue laser 11B, and forms the coupling to the first dichroic prism 131. Moreover, the third coupling lens 12R may be a lens (a coupling lens) that collimates the red light emitted from the red laser 11R, and forms coupling to the second dichroic prism 132. It is to be noted that in one preferable example, entering laser light may be collimated (into parallel light) by the respective coupling lenses 12R, 12G, and 12B.

The first dichroic prism 131 and the second dichroic prism 132 may each be the optical path composition element that composes the optical paths on which the respective two or more light sources are disposed. The first dichroic prism 131 may be a prism that selectively transmits the blue light entering through the first coupling lens 12B, and selectively reflects the green light entering through the second coupling lens 12G. The second dichroic prism 132 may be a prism that selectively transmits the blue light and the green light outputted from the first dichroic prism 132, and selectively reflect the red light entering through the third coupling lens 12R. Thus, color composition (the optical path composition) with respect to the red light, the green light, and the blue light may be made.

The drive optical element 14 may be an optical element provided for reduction in a speckle noise and an interference fringe in the illumination light L1. The drive optical element 14 may be disposed on an optical path between the first condenser lens 161 and the second condenser lens 162. The drive optical element 14 may make minute vibration, for example, in a direction along an optical axis, or in a direction perpendicular to the optical axis, to cause a change in a light flux passing therethrough, and to allow for the reduction in the speckle noise and the interference fringe in the illumination light L1.

The first fly eye lens 151 and the second fly eye lens 152 may each be an optical member (an integrator) in which a plurality of lenses are two-dimensionally disposed on a substrate. The first fly eye lens 151 and the second fly eye lens 152 may each spatially divide an entering light flux in accordance with the disposition of the plurality of lenses, and output the resultant light. The first fly eye lens 151 may be disposed on an optical path between the second dichroic prism 132 and the first condenser lens 161. The second fly eye lens 152 may be disposed on an optical path between the second condenser lens 162 and the third condenser lens 163. With the first fly eye lens 151 and the second fly eye lens 152, uniformization of distribution of light quantity of the illumination light L1 in an in-plane direction may be attained.

The mirror 18 may be an element that bends an optical path of the illumination light L1. The mirror 18 may be disposed on an optical path between the first condenser lens 161 and the drive optical element 14. The first condenser lens 161 may be a lens that collects outputted light from the first fly eye lens 151, and allows the resultant light to enter the drive optical element 14 through the mirror 18. The second condenser lens 162 may be a lens that collects outputted light from the drive optical element 14, and allows the resultant light to enter the second fly eye lens 152.

The third condenser lens 163 and the fourth condenser lens 164 may each be a lens that collects outputted light from the second fly eye lens 152, and outputs the resultant light as the illumination light L1 toward the wire grid 27.

The wire grid 27 may include a metal lattice of minute mesh formed on, for example, a glass substrate. The wire grid 27 may be the polarized light separation element that separates entering light into a first polarized component (e.g., a P polarized component) and a second polarized component (e.g., an S polarized component), and outputs the resultant polarized components in different directions from each other. The wire grid 27 may selectively reflect a specific part of the first polarized component, and selectively transmit a specific part of the second polarized component. In one example, the wire grid 27 may reflect most of the P polarized component included in the entering illumination light L1, and transmit most of the S polarized component.

The light valve 21 may be, for example, a reflection-type liquid crystal element such as LCOS (Liquid Crystal On Silicon). In one example, the light valve 21 may modulate, on the basis of picture data, the first polarized component (e.g., the P polarized component) that is included in the illumination light L1 and has entered through the wire grid 27. The light valve 21 may also output the modulated light through the wire grid 27. From the light valve 21, for example, the S polarized component a polarized state of which is rotated from a state at the time of entering may be outputted as the modulated light. It is to be noted that in the light valve 21, black display may be performed by returning the entering P polarized component to the wire grid 27, with its polarized state unchanged.

The projection lens 24 may project the modulated light from the light valve 21 on a projection plane 30A of a screen. The modulated light has entered through the wire grid 27. The projection lens 24 may be a projection optical system provided for picture projection.

[Modification Examples of Optical System]

FIG. 1 illustrates, as the polarized light separation element, a configuration example with the use of the wire grid 27. But another configuration may be possible in which a prism-shaped polarization beam splitter 23 is used instead of the wire grid 27.

Moreover, in the illumination unit 1 in the configuration of FIG. 1, either the first fly eye lens 151 or the second fly eye lens 152 may be provided. In a case solely with the second fly eye lens 152, the first condenser lens 161 and the second condenser lens 162 may become unnecessary. In a case solely with the first fly eye lens 151, the third condenser lens 163 and the fourth condenser leys 164 may become unnecessary.

[1.1.2 Operation of Projection Display Apparatus]

In the projection display apparatus, the illumination light L1 may be generated by the illumination unit 1. The light valve 21 may modulate the illumination light L1, on the basis of the picture data, and output the modulated light. The projection lens 24 may project the modulated light from the light valve 21 on the projection plane 30A.

[1.2 Configuration and Operation of Control System of Illumination Unit]

[1.2.1 Configuration Example of Control System of Illumination Unit]

FIG. 2 illustrates one configuration example of a control system of the illumination unit 1. The projection display apparatus may include, as the control system of the illumination unit 1, a main controller 100, a red light source device 101R, a green light source device 101G, and a blue light source device 101B. Each of the light source devices may include a temperature sensor 102, a light quantity sensor 103, a storage unit 104, a current control unit 105, a target light quantity setting unit 106, and a temperature correction unit 107.

The temperature sensors 102 may be disposed respectively in the vicinity of the red laser 11R, the green laser 11G, and the blue laser 11B that may serve as the plurality of laser light sources. The temperature sensors 102 may detect respective temperatures of them.

The light quantity sensors 103 may be provided respectively for the red laser 11R, the green laser 11G, and the blue laser 11B. The light quantity sensors 103 may detect light quantities of light generated by the respective laser light sources.

The storage units 104 may store various kinds of parameters for a light source control. In the storage units 104, light quantities of the respective laser light sources in a condition of predetermined white balance may be stored as target light quantity values Qa. Moreover, in the storage units 104, temperatures in the condition of the predetermined white balance may be stored as reference temperatures T0. Furthermore, in the storage units 104, wavelengths of the respective laser light sources in the condition of the reference temperatures T0 may be stored as reference wavelengths λ0. In addition, in the storage units 104, maximum current values of drive currents may be stored as limit current values Imax. The maximum current values of the drive currents may be values of currents allowed by the respective laser light sources to flow therethrough.

The temperature correction units 107 may correct the light quantities of the light to be generated by the respective laser light sources, on the basis of a change in relative luminosity, to restrain a change in the white balance, as described later. The change in the relative luminosity is caused by changes in wavelengths associated with changes in temperatures of the respective laser light sources. The target light quantity setting units 106 may set the target light quantity values Qa with respect to the current control units 105.

The current control units 105 may control the drive currents of the respective laser light sources. The current control units 105 may set current values of the drive currents, on the basis of the target light quantity values Qa and output values of the light quantity sensors 103, so as to allow the light quantities of the light to be generated by the respective laser light sources to approximate to the target light quantity values Qa. The target light quantity values Qa may be set in the target light quantity setting units 106.

The main controller 100 may control each of the light source devices. As described later, the main controller 100 may change, as appropriate, a setting current value and the target light quantity value Qa of at least one laser light source out of the plurality of laser light sources, so as to keep the drive currents of the respective laser light sources from being larger than the limit current values Imax.

[1.2.2 Control Operation of Illumination Unit]

[APC (Auto Power Control) Operation]

The main controller 100 may set the target light quantity values Qa in the respective target light quantity setting units 106 of the red light source device 101R, the green light source device 101G, and the blue light source device 101B. The target light quantity values Qa may be stored in the respective storage units 104. The main controller 100 may allow the respective current control units 105 to start laser driving.

In the respective light source devices, the current control units 105 may control the drive currents, from the light quantities of the laser light sources and the target light quantity values Qa, so as to allow the light quantities of the laser light sources to constantly approximate to the target light quantity values Qa. The light quantities of the laser light sources may be acquired from the light quantity sensors 103. The target light quantity values Qa may be set in the target light quantity setting units 106.

[Changes in Characteristics of Light Sources in accordance with Temperature]

Here, with reference to FIGS. 11 to 16, description is given of changes in characteristics of a general laser light source in accordance with a temperature. FIG. 11 illustrates relation between a temperature and output light quantities of light sources. FIG. 12 illustrates relation between a wavelength and the relative luminosity. FIG. 13 illustrates one example of a change in wavelength of the laser light source in accordance with the temperature. FIG. 14 illustrates relation between the wavelength and the relative luminosity. FIG. 15 illustrates a change in the drive current of the laser light source in accordance with the temperature. FIG. 16 illustrates one example of the change in the wavelength of the laser light source in accordance with the temperature.

As illustrated in FIG. 11, the light quantities of the light sources change with the change in the temperature. Moreover, as illustrated in FIGS. 13 and 16, an oscillation wavelength of the light source changes with the change in the temperature. Furthermore, as illustrated in FIG. 15, in the laser light source, a threshold current increases with an increase in the temperature. Meanwhile, as illustrated in FIGS. 12 and 14, brightness sensed by human eyes (the relative luminosity) varies with the wavelength, even if the light quantity of the light is the same. Accordingly, for example, an increase in the temperature of the light source causes a light emission wavelength to be lengthened at a constant rate, which causes the change in the relative luminosity. In this case, solely keeping a ratio of the light quantities constant may cause the change in the white balance when the temperature changes significantly.

To cope with the changes in the characteristics, this embodiment may involve performing control operation as follows.

[Current Limiting Operation]

As described, in the laser light source, the threshold current increases with the increase in the temperature. Meanwhile, it is necessary for the drive currents that drive the laser light sources to be constantly equal to or lower than the limit current values Imax that keep the laser light sources from being destructed.

It is to be noted that because description here is simply given of changing operation of the target light quantity values Qa on the basis of the limit current values Imax, without consideration of the change in the relative luminosity associated with the change in the temperature. However, in one preferable example, in actual operation, the operation on the basis of the limit current values Imax as described here may be performed together with correcting operation of the target light quantity values Qa with the temperature correction units 107 in consideration of the change in the relative luminosity associated with the temperature as described later.

[First Example of Current Limiting Operation]

The main controller 100 as a setting control unit may control the current control unit 105 to change the setting current value in any specific light source out of the plurality of light sources, in a case in which the current value to be set with respect to the specific light source is determined as being larger than the limit current value Imax. The main controller 100 may also change the target light quantity values Qa of the respective plurality of laser light sources. In the following, for example, description is given on an exemplary case, with the red laser 11R of the red light source device 101R being assumed to be the specific light source, in which the red laser 11R fails in outputting the initial target light quantity value Qa with the drive current being equal to or lower than the limit current value Imax, as illustrated in FIGS. 3 to 5, when the temperature of the laser light source increases.

In the respective light source devices, the storage units 104 may store in advance the limit current values Imax of the laser light sources. The main controller 100 may change, as appropriate, the setting current values and the target light quantity values Qa, to keep the drive currents of the respective laser light sources from being larger than the limit current values Imax. For example, as illustrated in FIG. 3, outputting the initial target light quantity value Qa may cause the setting current value of the red laser 11R to be larger than the limit current value Imax. Thus, in a case in which the current value to be set by the current control unit 105 is determined as being larger than the limit current value Imax, the main controller 100 may control the current control unit 105, to allow the setting current value in the red laser 11R as the specific light source to be changed to a value equal to or smaller than the limit current value Imax. Moreover, the main controller 100 may simultaneously change the target light quantity values Qa of all the light source devices. For example, the change in the target light quantity values Qa of all the light source devices may be made at a constant rate k (<1).

FIG. 6 illustrates one example of the changes in the light quantities with the current limiting operation as described above. FIG. 7 illustrates the changes in the light quantities illustrated in FIG. 6, with reference to green. As seen from FIG. 7, with the current limiting operation as described above, the ratio of the target light quantity values Qa of the respective light source devices is unchanged. This makes it possible to make the projected image as bright as possible, while keeping the white balance of the projected image constant.

[Second Example of Current Limiting Operation]

The main controller 100 may control the current control unit 105 to change the setting current value solely in any specific light source out of the plurality of light sources, in a period in which the change in the white balance is in a predetermined state (a white balance changing state), in a case in which the current value to be set with respect to the specific light source is determined as being larger than the limit current value Imax. The main controller 100 may also change the target light quantity value Qa solely of the specific light source, in the predetermined state. The main controller 100 may change the target light quantity values Qa of the respective plurality of laser light sources, on a condition that the change in the white balance goes out of the predetermined state, to cause approximation to white balance before the period in which the change in the white balance is in the predetermined state. In one specific example, the target light quantity value Qa of the specific light source may be changed with reference to a value of the target light quantity value before the change in the period that the change in the white balance is in the predetermined state.

In what follows, description is given of an exemplary case with the red laser 11R serving as the specific light source, as with the first example as described above. Regarding, for example, the red laser 11R, in a case in which the current value to be set by the current control unit 105 is determined as being larger than the limit current value Imax, the main controller 100 may control the current control unit 105, to allow the setting current value in the red laser 11R as the specific light source to be changed to the value equal to or smaller than the limit current value Imax. Moreover, the main controller 100 may change the target light quantity value Qa solely of the red laser 11R, while a rate of the output value of the light quantity sensor 103 to the target light quantity value Qa is equal to or larger than a constant rate m (<1). For example, the change in the target light quantity value Qa solely of the red laser 11R may be made at a constant rate p (<1). This state is referred to as the white balance changing state.

In a case in which the rate becomes smaller than the constant rate m (<1) and the change in the white balance goes out of the white balance changing state, the main controller 100 may simultaneously change the target light quantity values Qa of all the light source devices. For example, the change in the target light quantity values Qa of all the light source devices may be made at the constant rate k (<1). However, regarding the red light source device 101R, a part changed at the rate p (<1) in the white balance changing state may be excluded. In other words, when the rate becomes smaller than the constant rate m (<1), the main controller 100 may change, at the constant rate k (<1), the target light quantity values of the light sources (here, the green laser 11G and the blue laser 11B) other than the specific light source out of the plurality of laser light sources. Moreover, the main controller 100 may change the target light quantity value of the specific light source at the rate k with respect to the value before the change is made at the rate p.

FIG. 8 illustrates one example of the changes in the light quantities with the current limiting operation as described above. FIG. 9 illustrates the changes in the light quantities illustrated in FIG. 8, with reference to green. As seen from FIG. 8, it is possible to restrain lowering of the brightness of the projected image, while the change in the white balance is within a predetermined range.

It is to be noted that values of the rates k, m, and p may be varied as appropriate by the main controller 100. Moreover, these rates may be set as different values for the respective light source devices.

[Temperature Correction Operation]

In the respective light source devices, the temperature correction units 107 may obtain the wavelengths $\lambda$ of the light generated by the respective plurality of laser light sources, with the use of output values of the temperature sensors 102, and the reference temperatures T0 and the reference wavelengths $\lambda 0$ stored in the storage units 104.

The temperature correction units 107 may correct the target light quantity values Qa with regard to the respective plurality of laser light sources, on the basis of the relative luminosity at the respective wavelengths of the light and the relative luminosity at the reference wavelengths λ0.

Description here is given on one specific example of the red light source device 101R, but the same may apply to all the light source devices. Assume that an amount of the change in the wavelength of the laser light source with respect to the temperature is 0.2 nm/° C. The temperature correction units 107 may obtain the wavelengths λ at temperatures T as follows, with the use of the temperatures T acquired from the temperature sensors 102, and the reference temperatures T0 and the reference wavelengths λ0 stored in the storage units 104.

$$\lambda = 0.2 \times (T - T0) \lambda 0 \text{ [nm]}$$

The temperature correction units 107 may hold in advance, as a table, relation between the relative luminosity and the wavelength in the vicinity of the wavelength of the laser light source to be used. The temperature correction units 107 may correct the target light quantity values Qa set in the target light quantity setting units 106, from ratios of the relative luminosity at the obtained laser wavelengths to the relative luminosity at the reference wavelengths.

FIG. 10 illustrates the changes in the light quantities immediately after start of lighting of the laser light sources, as an example of a rapid increase in the temperature, in a case in which the correction of the target light quantity values Qa with the temperature correction units 107 as described above is enabled. In the example of FIG. 10, there is a significant increase in the light quantity of the red laser 11R. This is because the amount of the correction in the red laser 11R is relatively large. In other words, regarding the red laser 11R, as seen from FIGS. 12 to 14, there is a tendency that the increase in the temperature causes the wavelength to be lengthened, which causes the lowered relative luminosity. Accordingly, in order to correct this, it is necessary to increase the light quantity.

With the operation as described, it is possible to prevent the change in the white balance depending on the temperatures of the laser light sources.

Modification Example

It is to be noted that in one preferable example, in the actual operation, the correction of the target light quantity values Qa with the temperature correction units 107 in consideration of the change in the relative luminosity as described here may be performed together with the changing operation of the target light quantity values Qa on the basis of the limit current values Imax as illustrated in FIGS. 3 to 9 as described above.

In another alternative, regarding the current limiting operation as described, the main controller 100 may perform, as necessary, a switching (ON/OFF) control on whether or not to perform the control of the drive currents that involves changing the target light quantity values Qa. Moreover, regarding the temperature correction operation as described above, the main controller 100 may perform, as necessary, a switching (ON/OFF) control on whether or not to allow the temperature correction units 107 to make the correction of the target light quantity values Qa. In one possible example, the changing operation of the target light quantity values Qa on the basis of the limit current values Imax may be turned OFF, in order to give priority to brightness and to provide allowance for a certain degree of disturbance of the white balance.

Moreover, the forgoing description exemplifies a case in which each of the light source devices includes the single laser light source. However, the similar control may be performed in a case with a plurality of laser light sources of a same color. In this case, for example, a control may be performed independently of each of the plurality of laser light sources of the same color.

[1.3 Effects]

As described, according to this embodiment, the light quantities of the light to be generated by the plurality of light sources may be corrected, on the basis of the change in the relative luminosity caused by the changes in the wavelengths associated with the changes in the temperatures. Hence, it is possible to restrain the change in the white balance that occurs due to the change in the relative luminosity caused by the changes in the wavelengths associated with the changes in the temperatures. Moreover, it is possible to restrain the change in the white balance, even when the increase in the temperature causes the drive currents to reach the limit current values Imax, in a case in which the laser light source is used as the light source. The combination of the two operations as described above allows for the use of the light sources in a condition closest to limits of their characteristics. This makes it possible to provide the picture as bright as possible and with the white balance kept as constant as possible.

It is to be noted that effects described herein are merely exemplified and not limitative, and effects of the disclosure may be other effects or may further include other effects. The same may apply to other embodiments described below.

Second Embodiment

Description is given next of a second embodiment of the disclosure. In the following, description of parts having similar configurations and workings as those of the forgoing first embodiment is omitted as appropriate.

[2.1 Configuration of Control System of Illumination Unit]

FIG. 17 illustrates one configuration example of a control system of the illumination unit 1 in a projection display apparatus according to this embodiment. It is to be noted that in this embodiment, an overall configuration of the projection display apparatus (a projector) may be similar to that illustrated in FIG. 1.

This embodiment may involve making, with reference to one predetermined laser light source, correction of the light quantities associated with the changes in the temperatures of other-than-predetermined laser light sources, i.e., other light sources than the predetermined laser light source. For example, the correction may be made with reference to the green laser 11G. In FIG. 17, the temperature correction unit 107 and the temperature sensor 102 are omitted from the green light source device 101G including the green laser 11G as the reference. This makes a difference from the configuration example illustrated in FIG. 2. The temperature sensors 102 may be provided in the other-than-predetermined laser light sources (the blue laser 11B and the red laser 11R) other than the predetermined laser light source (the green laser 11G).

In the respective light source devices, in the storage units 104, the light quantities of the laser light sources in the condition of the predetermined white balance may be stored as the target light quantity values Qa. Moreover, in the other-than-predetermined light source devices other than the green light source device 101G as the reference, in the storage units 104, the temperatures in the condition of the predetermined white balance may be stored as the reference temperatures T0. Furthermore, in the respective light source devices, in the storage units 104, the maximum current values of the drive currents may be stored as the limit current values Imax. The maximum current values of the drive currents may be values of currents allowed by the respective laser light sources to flow therethrough.

[2.2 Control Operation of Illumination Unit]

In this embodiment, the APC operation and the current limiting operation may be similar to those of the forgoing first embodiment.

[Temperature Correction Operation]

In this embodiment, in the other-than-predetermined light source devices other than the green light source device 101G as the reference, the temperature correction units 107 may correct, on the basis of the change in the relative luminosity, the light quantities of the light to be generated by the other-than-predetermined laser light sources, to restrain the change in the white balance. The change in the relative luminosity may be caused by the changes in the wavelengths associated with the changes in the temperatures of the other-than-predetermined laser light sources, with reference to the predetermine laser light source. The temperature correction units 107 may correct the target light quantity values Qa with respect to the other-than-predetermined laser light sources, on the basis of predetermined correction coefficients, and the output values of the temperature sensors 102 and the reference temperatures T0. The predetermined correction coefficients may be calculated on the basis of the predetermined laser light source.

In the following, description is given on a case with the green laser 11G as the reference. Assume that the amounts of the changes in the wavelengths with respect to the temperature of the respective laser light sources of the light source devices are as follows.

0.2 nm/° C. in the red laser 11R
0.05 nm/° C. in the green laser 11G
0.06 nm/° C. in the blue laser 11B Assume that the wavelengths at the reference temperatures T0, i.e., 25° C. are as follows.

637 nm in the red laser 11R
520 nm in the green laser 11G
448 nm in the blue laser 11B The temperature correction units 107 may calculate an amount of the change in the relative luminosity with respect to the temperature, with the use of an amount of the change in the relative luminosity with reference to the wavelengths as listed above, and the amounts of the changes in the wavelengths with respect to the temperatures as listed above.

FIG. 18 is a plot of the amounts of the changes in the relative luminosity with respect to the temperature, for the respective laser light sources. Expressions of linear approximation in a temperature range including a service temperature range of the projector may be as follows.

For the red laser 11R, $$y=-0.0085x+1 \quad (1)$$

For the green laser 11G, $$y=0.0013x+1 \quad (2)$$

For the blue laser 11B, $$y=0.0029x+1 \quad (3)$$

With use of the expressions (1) to (3), the amounts of the changes in the light quantities may be calculated as follows, in order to correct the change in the relative luminosity with reference to the green laser 11G. FIG. 19 is a plot of the amounts of the changes in the light quantities thus calculated.

For the red laser 11R, $$y=(0.0013x+1)/(-0.0085x+1)$$

For the blue laser 11B, $$y=(0.0013x+1)/(0.0029x+1)$$

Similarly, inclinations in expressions of the linear approximation in the temperature range including the service temperature range of the projector may be as follows.
For the red laser 11R, Ar=0.0103
For the blue laser 11B, Ab=−0.0016
These inclinations may be used as the correction coefficients.

The temperature correction units 107 may correct, as follows, the target light quantity values Qa set in the target light quantity setting units 106, with the use of a difference between the temperatures T of the laser light sources and the reference temperatures T0, and the correction coefficients as described above. The temperatures T of the laser light sources may be acquired from the temperature sensors 102.

{target light quantity value after change}=(temperature difference×correction coefficient)+{current target light quantity value}

FIG. 20 illustrates the changes in the light quantities immediately after the start of the lighting of the laser light sources, as the example of the rapid increase in the temperatures, in the case in which the correction of the target light quantity values Qa with the temperature correction units 107 as described above is enabled. In the example of FIG. 20, there is a significant increase in the light quantity of the red laser 11R. This is because the amount of the correction in the red laser 11R is relatively large.

FIG. 21 illustrates a change in color balance with x-y chromaticity coordinates, in a case in which no correction of the target light quantity values Qa with the temperature correction units 107 is made (the temperature correction OFF). Moreover, a partially enlarged diagram of FIG. 21 is provided in FIG. 22. FIG. 23 illustrates the change in the color balance with the x-y chromaticity coordinates, in a case in which the correction of the target light quantity values Qa with the temperature correction units 107 is enabled (the temperature correction ON). Moreover, a partially enlarged diagram of FIG. 23 is provided in FIG. 24.

FIGS. 21 to 24 illustrate the x-y chromaticity coordinates of the projected image, in a case in which the temperatures of the laser light sources change by about ±15° C. with respect to the reference temperatures T0. As illustrated in FIGS. 23 and 24, it is understood that enabling the correction of the target light quantity values Qa with the temperature correction units 107 allows the change in the white balance to be significantly restrained with respect to the changes in the temperatures, as compared to the case in which no temperature correction is made (FIGS. 21 and 22).

Modification Examples

It is to be noted that as with the forgoing first embodiment, in one preferable example, the correction of the target light quantity values Qa with the temperature correction units 107 in consideration of the change in the relative luminosity may be performed together with the changing operation of the target light quantity values Qa on the basis of the limit current values Imax as illustrated in FIGS. 3 to 9 as described above.

As one example, FIG. 25 illustrates an example of the changes in the light quantities, in a case in which the changing operation of the target light quantity values Qa on the basis of the limit current values Imax illustrated in FIG. 6 as described above is combined with the correction of the target light quantity values Qa with the temperature correction units 107 as illustrated in FIG. 20.

Moreover, in this embodiment as well, regarding the current limiting operation, the main controller 100 may perform, as necessary, the switching (ON/OFF) control on whether or not to perform the control of the drive currents that involves changing the target light quantity values Qa. Moreover, regarding the temperature correction operation, the main controller 100 may perform, as necessary, the switching (ON/OFF) control on whether or not to allow the temperature correction units 107 to make the correction of the target light quantity values Qa.

Furthermore, the forgoing description exemplifies the case in which each of the light source devices includes the single laser light source. However, the similar control may be performed in the case with a plurality of laser light sources of the same color. In this case, for example, the control may be performed independently of each of the plurality of laser light sources of the same color. The correction coefficients of the target light quantity values Qa may be the same for the plurality of laser light sources of the same color.

[2.3 Effects]

According to this embodiment, it is unnecessary to store the reference wavelengths λ0 in the storage units 104, unlike the forgoing first embodiment. Moreover, it is possible to reduce the number of the temperature sensors 102 and the number of the temperature correction units 107. Regardless thereof, it is possible to significantly reduce the change in the white balance associated with the change in the relative luminosity.

3. Other Embodiments

The technology according to the disclosure is not limited to the description of the above-mentioned example embodiments and may be modified in a variety of ways.

For example, the technology may have the following configuration.

(1)
An illumination device, including:
a plurality of light sources that generate light having respectively different wavelengths; and
a correction unit that corrects, on a basis of a change in relative luminosity, a light quantity of the light to be generated by at least one light source out of the plurality of light sources, to restrain a change in white balance, the change in the relative luminosity being caused by a change in wavelength associated with a change in temperature.

(2)
The illumination device according to (1), further including temperature sensors that detect temperatures of the respective plurality of light sources, in which
the correction unit corrects, on the basis of the change in the relative luminosity, the light quantities of the light to be generated by the respective plurality of light sources, to restrain the change in the white balance, the change in the relative luminosity being caused by the changes in the wavelengths associated with the changes in the temperatures of the respective plurality of light sources.

(3)
The illumination device according to (2), further including a storage unit that stores target light quantity values, reference temperatures, and reference wavelengths regarding the respective plurality of light sources in a condition of predetermined white balance, in which
the correction unit obtains respective wavelengths of the light generated by the plurality of light sources, with use of output values of the temperature sensors, the reference temperatures, and the reference wavelengths, and corrects the target light quantity values with regard to the respective plurality of light sources, on a basis of the relative luminosity at the respective wavelengths of the light and the relative luminosity at the reference wavelengths.

(4)
The illumination device according to (1), further including temperature sensors that detect temperatures of other-than-predetermined light sources, the other-than-predetermined light sources being other light sources than a predetermined light source out of the plurality of light sources, in which
the correction unit corrects, on the basis of the change in the relative luminosity, the light quantities of the light to be generated by the other-than-predetermined light sources, to restrain the change in the white balance, the change in the relative luminosity being caused by the changes in the wavelengths associated with the changes in the temperatures of the other-than-predetermined light sources, with reference to the predetermined light source.

(5)
The illumination device according to (4), further including a storage unit that stores target light quantity values and reference temperatures regarding the other-than-predetermined light sources in a condition of predetermined white balance, in which
the correction unit corrects the target light quantity values with regard to the other-than-predetermined light sources, on a basis of predetermined correction coefficients, output values of the temperature sensors, and the reference temperatures, the predetermined correction coefficients being calculated with reference to the predetermined light source.

(6)
The illumination device according to any one of (1) to (5), further including a main controller that performs a switching control on whether or not to allow the correction unit to correct the light quantity.

(7)
The illumination device according to any one of (1) to (6), further including:
light quantity sensors that detect the light quantities of the light generated by the respective plurality of light sources;
a storage unit that stores target light quantity values regarding the respective plurality of light sources in a condition of predetermined white balance; and
a current control unit that controls drive currents of the respective plurality of light sources, in which
the current control unit provides, on a basis of the target light quantity values and output values of the light quantity sensors, setting current values of the drive currents, to allow the light quantities of the light to be generated by the respective plurality of light sources to approximate to the target light quantity values.

(8) The illumination device according to (7), further including a setting control unit that changes the target light quantity values, in which
the storage unit further stores limit current values of the drive currents of the respective plurality of light sources, and
the setting control unit changes the setting current value and the target light quantity value of the at least one light source out of the plurality of light sources, to keep the drive currents of the respective plurality of light sources from being larger than the limit current values.

(9) The illumination device according to (8), in which
the setting control unit changes, upon determination that the setting current value to be provided with regard to any specific light source out of the plurality of light sources becomes larger than the limit current value, the setting current value of the specific light source, and changes the target light quantity values of the respective plurality of light sources.

(10) The illumination device according to (8), in which
the setting control unit
changes, upon determination that the setting current value to be provided with regard to any specific light source out of the plurality of the light sources becomes larger than the limit current value, the setting current value and the target light quantity value solely of the specific light source out of the plurality of light sources, in a period in which the change in the white balance is in a predetermined state, and
changes the target light quantity values of the respective plurality of light sources on a condition that the change in the white balance goes out of the predetermined state.

(11) The illumination device according to (10), in which
on a condition that the change in the white balance goes out of the predetermined state,
the setting control unit changes the target light quantity values of the respective plurality of light sources, to cause approximation to white balance before the period in which the change in the white balance is in the predetermined state.

(12) The illumination device according to any one of (8) to (11), further including a main controller that performs a switching control on whether or not to allow the setting control unit to change the target light quantity values.

(13) A light source control method, including
correcting, on a basis of a change in relative luminosity, a light quantity of light to be generated by at least one light source out of a plurality of light sources, to restrain a change in white balance, the change in the relative luminosity being caused by a change in wavelength associated with a change in temperature, and the plurality of light sources generating the light having respectively different wavelengths.

(14) A projection display apparatus, including:
an illumination unit that generates illumination light;
a light valve that modulates the illumination light on a basis of picture data, and outputs resultant modulated light; and
a projection lens that projects the modulated light from the light valve on a plane of projection,
the illumination unit including
a plurality of light sources that generate light having respectively different wavelengths, and
a correction unit that corrects, on a basis of a change in relative luminosity, a light quantity of the light to be generated by at least one light source out of the plurality of light sources, to restrain a change in white balance, the change in the relative luminosity being caused by a change in wavelength associated with a change in temperature.

This application claims the benefit of Japanese Priority Patent Application JP2014-194770 filed on Sep. 25, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. An illumination device, comprising:
a plurality of light sources configured to generate light,
wherein a first light source of the plurality of light sources is configured to generate first light of a first wavelength and a second light source of the plurality of light sources is configured to generate second light of a second wavelength, and wherein the second wavelength is different from the first wavelength; and
circuitry configured to:
correct a first light quantity value of the first light,
wherein the first light quantity value is corrected based on a change in a first relative luminosity of the first light,
wherein the change in the first relative luminosity is based on a change in the first wavelength of the first light,
wherein the change in the first wavelength of the first light is based on a change in a first temperature of the first light source; and
control a change in a white balance of the first light based on the correction of the first light quantity value.

2. The illumination device according to claim 1, further comprising:
temperature sensors that are configured to detect the first temperature of the first light source or a second temperature of the second light source,
wherein the circuitry is further configured to correct, based on the change in the first relative luminosity, the first light quantity value of the first light and a second light quantity value of the second light to be generated by the respective plurality of light sources, to restrain the change in the white balance,
wherein the first light quantity value and the second light quantity value are corrected based on the change in the first relative luminosity of the first light and a second relative luminosity of the second light,
wherein the change in the first relative luminosity and the second relative luminosity is based on the change in at least one of the first wavelength or the second wavelength associated with a change in temperatures of the respective plurality of light sources.

3. The illumination device according to claim 2, further comprising a storage unit configured to store reference light quantity values, reference temperatures, and reference wavelengths of the respective plurality of light sources for a reference white balance,
wherein the circuitry is further configured to:
obtain respective wavelengths of the light generated by the plurality of light sources based on at least one of output values of the temperature sensors, the reference temperatures, or the reference wavelengths, and
correct the reference light quantity values of the respective plurality of light sources based on relative luminosities at the respective wavelengths of the light and a third relative luminosity at the reference wavelengths.

4. The illumination device according to claim 1, further comprising:
temperature sensors configured to detect temperature of the second light source of the plurality of light sources, wherein the second light source is different from the first light source, wherein
the circuitry is further configured to correct a second light quantity value of the second light,
wherein the second light quantity value is corrected based on a change in a second relative luminosity of the second light,
wherein the change in the second relative luminosity is based on a change in the second wavelength, wherein the change in the second wavelength is based on a change in a second temperature of the second light source, and
wherein the change in the second temperature of the second light source is calculated with reference to the first temperature of the first light source.

5. The illumination device according to claim 4, further comprising:
a storage unit configured to store reference light quantity values and reference temperatures regarding the second light source for a reference white balance, wherein
the circuitry is further configured to correct the reference light quantity values of the second light source based on at least one of correction coefficients, output values of the temperature sensors, or the reference temperatures, wherein the correction coefficients are calculated with reference to the first light source.

6. The illumination device according to claim 1, further comprising a main controller configured to control the circuitry based on an ability of the circuitry to correct the first light quantity value.

7. The illumination device according to claim 1, further comprising:
light quantity sensors configured to detect the first light quantity value of the first light; and
a storage unit configured to store reference light quantity values of the respective plurality of light sources for a reference white balance,
wherein the circuitry is further configured to:
control drive currents of the respective plurality of light sources;
determine setting current values of the drive currents based on the reference light quantity values and output values of the light quantity sensors; and
allow light quantity values of the light of the respective plurality of light sources to approximate to the reference light quantity values based on the output values of the light quantity sensors.

8. The illumination device according to claim 7, wherein the circuitry is further configured to a change the reference light quantity values,
wherein the storage unit is further configured to store limit current values of the drive currents of the respective plurality of light sources, and
the circuitry is further configured to change the setting current values and a reference light quantity value of at least one light source of the plurality of light sources, wherein the setting current values and reference light quantity value are changed such that the drive currents of the respective plurality of light sources are smaller than the respective limit current values.

9. The illumination device according to claim 8, wherein the circuitry is further configured to change a setting current value of a specific light source and the reference light quantity values of the respective plurality of light sources based on the setting current value of the specific light source that becomes larger than the respective limit current values.

10. The illumination device according to claim 8, wherein the circuitry is further configured to:
change a setting current value and a reference light quantity value of a specific light source of the plurality of light sources based on the setting current value of the first light source that becomes larger than a limit current value of the stored limit current values, wherein the setting current value and the reference light quantity value of the first light source are changed in a period in which the change in the white balance is in a reference state, and
change the reference light quantity values of the respective plurality of light sources based on a change in the white balance that becomes different from the reference state.

11. The illumination device according to claim 10, wherein
the circuitry is further configured to change the reference light quantity values of the respective plurality of light sources based on the change in the white balance,
wherein the change in the reference light quantity values of the respective plurality of light sources approximates the white balance before the period in which the change in the white balance is in the reference state.

12. The illumination device according to claim 8, further comprising a main controller configured to control the circuitry to change the reference light quantity values.

13. A light source control method, comprising
correcting a light quantity value of light generated by at least one light source of a plurality of light sources,
wherein the light quantity value is corrected based on a change in a relative luminosity of the light,
wherein the change in the relative luminosity is based on change in a wavelength of the light,
wherein the change in the wavelength is based on a change in a temperature of the at least one light source,
wherein the plurality of light sources are configured to generate the light,
wherein a first light source of the plurality of light sources is configured to generate first light of a first wavelength and a second light source of the plurality of light sources is configured to generate second light of a second wavelength, and wherein the second wavelength is different from the first wavelength; and
controlling a change in a white balance of the light based on the correction of the light quantity value of the light.

14. A projection display apparatus, comprising:
an illumination unit configured to generate illumination light;
a light valve configured to:
    modulate the illumination light based on picture data, and
    output modulated light based on a result of the modulation of the illuminated light; and
a projection lens configured to project the modulated light from the light valve on a plane of projection,
wherein the illumination unit includes:
    a plurality of light sources configured to generate light, wherein a first light source of the plurality of light sources is configured to generate first light of a first wavelength and a second light source of the plurality of light sources is configured to generate second light of a second wavelength, and wherein the second wavelength is different from the first wavelength; and
    circuitry configured to:
        a light quantity value of the light,
        wherein the light quantity value is corrected based on a change in a relative luminosity of the light,
        wherein the change in the relative luminosity is based on a change in the first wavelength of the light,
        wherein the change in the first wavelength of the first light is based on a change in a first temperature of a first light source of the plurality of light sources; and
    control a change in a white balance of the first light based on the correction of the light quantity value.

15. An illumination device, comprising:
a plurality of light sources configured to generate light,
wherein a first light source of the plurality of light sources is configured to generate first light of-a first wavelength and a second light source of the plurality of light sources is configured to generate second light of a second wavelength, and wherein the second wavelength is different from the first wavelength;
a storage unit configured to store light quantity values of the respective plurality of light sources in a reference state of white balance of the light; and
circuitry configured to:
    correct a light quantity value of the light generated by at least one light source of the plurality of light sources, wherein the light quantity value is corrected based on a change in a relative luminosity of the light, wherein the change in the relative luminosity is based on a change in a first wavelength of the first light, wherein the change in the first wavelength of the first light is based on a temperature of the at least one light source,
    control a change in a white balance of the light based on the correction of the light quantity value of the light,
    control drive currents of the plurality of light sources, wherein the drive current controls the plurality of light sources,
    determine setting current values of the drive currents based on reference light quantity values and output values of light quantity sensors, wherein the setting current values allow the light quantity values of the light to approximate to the reference light quantity values,
    change the setting current values and a reference light quantity value of the at least one light source based on the setting current value of the at least one light source that becomes larger than a limit current value,
    wherein the setting current value and the reference light quantity value of the at least one light source is changed in a period in which the change in the white balance is in the reference state, and
    change the reference light quantity values of the respective plurality of light sources based on the change in the white balance that becomes different from the reference state.

* * * * *